United States Patent Office 3,654,169
Patented Apr. 4, 1972

3,654,169
METHOD OF SCALE INHIBITION USING PHOSPHONATE DERIVATIVES OF ISOCYANURIC ACID
Edwin A. Matzner, Kirkwood, and Robert S. Mitchell, Webster Groves, Md., assignors to Monsanto Company, St. Louis, Mo.
No Drawing. Filed Jan. 11, 1971, Ser. No. 105,708
Int. Cl. C02b *5/06;* C07d *55/38*
U.S. Cl. 252—180                                      11 Claims

ABSTRACT OF THE DISCLOSURE

The precipitation of scale-forming salts in an aqueous system is inhibited by adding either stoichiometric or substoichiometric amounts to said system of derivatives of isocyanuric acid of the general formula

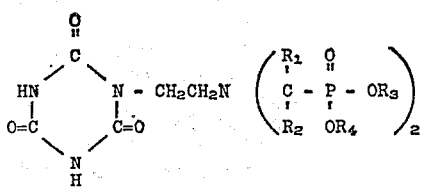

wherein $R_1$ and $R_2$ are hereinafter defined and $R_3$ and $R_4$ are each hydrogen or a metal ion.

---

This invention relates to methods for inhibiting the precipitation of metal ions from aqueous solutions, and more particularly, to the use of derivatives of isocyanuric acid to accomplish this purpose.

Most commercial water contains iron and alkaline earth metal cations, such as clacium, barium, magnesium, etc., and several anions such as bicarbonate, carbonate, sulfate, oxalate, phosphate, silicate, fluoride, etc. When combinations of these anions and cations are present in concentrations which exceed the solubility of their reaction products, precipitates form until their reaction solubility product concentrations are no longer exceeded. For example, when the concentrations of calcium ion and sulfate ion exceed the solubility of the calcium sulfate, a solid phase of calcium sulfate will form.

Solubility product concentrations are exceeded for various reasons, such as evaporation of the water phase, change in pH, pressure or temperature, and the introduction of additional ions which form insoluble compounds with the ions already present in the solution.

As these reaction products precipitate on the surfaces of the water carrying system, they form scale. The scale prevents effective heat transfer, interferes with fluid flow, facilitates corrosive processes, and harbors bacteria. The presence of this scale is an expensive problem in many industrial water systems, oil wells, and the like causing delays and shutdowns for cleaning and removal.

Scale-forming compounds can be prevented from precipitating by inactivating their cations with chelating or sequestering agents, so that the solubility of their reaction products is not exceeded. Generally, this requires many times as much chelating or sequestering agent as cation, and these amounts under certain conditions are not always desirable or economical.

More than twenty-five years ago it was discovered that certain inorganic polyphosphates would prevent such precipitation when added in amounts less than the concentrations needed for sequestering or chelating. See, for example, Hatch and Rice, "Industrial Engineering Chemistry," vol. 31, pages 51 and 53; Reitmeier and Buehrer, "Journal of Physical Chemistry," vol. 44, No. 5, pages 535 and 536 (May 1940); Fink and Richardson U.S. Pat. 2,358,222; and Hatch U.S. Pat 2,539,305, all of which are incorporated herein by reference. For sequestration, the mole ratio of precipitation inhibitor equivalents to scale forming cation is usually 1:1 or greater (2:1, 3:1, etc.). These ratios are referred to as stoichiometric. Substoichiometric amounts would include all mole ratios of precipitation inhibitor equivalent to scale forming cation that are less than the level required for sequestration; this phenomenon is known in the water treating art as the "threshold" effect.

It is to be understood that the term "threshold" as utilized herein refers to the chemical and/or physical phenomenon that less than stoichiometric quantities of the particular precipitation inhibitor can effectively prevent the precipitation and/or alter the crystal form of salts of various metal ions such as calcium, iron, copper and cobalt. In other words, the "threshold" treatment of water is that technique by means of which less than stoichiometric quantities of the treating agent are added to interfere with the growth of crystal nuclei and thereby prevent the deposition of insoluble deposits.

Consequentially precipitation inhibitors which function both as a threshold agent and a sequestering agent represent an advancement in the art and are in substantial demand.

Therefore, an object of this invention is to provide a method for inhibiting the precipitation of metal ions from aqueous solutions.

Another object of this invention is to provide a precipitation inhibitor which is effective in inhibiting the precipitation of metal ions in acid or alkaline aqueous solutions.

A still further object of this invention is to provide a precipitation inhibitor which is effective in inhibiting the precipitation of iron ions and calcium ions in acid or alkaline solutions.

Other objects will become apparent from a reading of the following description.

It has been found that certain derivatives of isocyanuric acid unexpectedly function as superior precipitation inhibitors when used in substoichiometric concentrations. This phenomenon includes what is generally known in the art as the "threshold effect." Furthermore these derivatives of isocyanuric acid are found to function as sequestering agents where one so desires to use the same.

These isocyanuric acid derivatives correspond to the following formula:

(I)

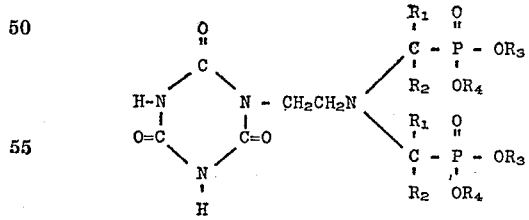

In the above Formula I, $R_1$ and $R_2$ can each be alike or unlike and are from the group of hydrogen and organic radicals (hereinafter defined).

In Formula I, $R_3$ and $R_4$ can be alike or unlike and are from the group metal ions (including ammonium ions and alkyl ammonium ions) and hydrogen. The aforementioned metal ions are from the group of metals which includes without limitation alkali metals such as sodium, lithium and potassium; alkaline earth metals, such as calcium and magnesium; aluminum; zinc; cadmium; manganese; nickel; cobalt; cerium; lead; tin; iron; chromium; and mercury. Also included are ammonium ions and alkyl ammonium ions. In particular, those alkyl ammonium ions derived from amines having a low molecular weight, such as below about 300, and more particularly the alkyl amines, alkylene amines, and alkanol amines containing not more than two amine groups, such as ethyl amine, diethyl amine, propyl amine, propylene diamine, hexyl amine, 2-ethylhexylamine, N-butylethanol amine, triethanol amine, and the like, are the preferred amines. It is to be understood that the preferred metal ions are those which render the compound a water-soluble salt.

In Formula I above, $R_1$ and $R_2$ are either hydrogen or organic groups. This Formula I includes salts, partial salts, acids and partial acids. When $R_1$ and/or $R_2$ is an organic group, the preferred substituents (or groups) are the following:

(a) alkyl-containing from about 1 to about 18 carbon atoms;
(b) alkenyl-containing from about 1 to about 18 carbon atoms;
(c) aryl-phenyl, naphthyl, anthryl, or phenanthryl;
(d) alkyl aryl (alkaryl)-hydroxy, halogen, lower alkyl, having from 1 to about 6 carbon atoms, and amino substituted phenyl, naphthyl, anthryl, or phenanthryl;
(e) cyclic-containing from about 4 to about 8 carbon atoms and there may be present in the ring either a nitrogen, sulfur, oxygen or phosphorus atom; and
(f) alicyclic-containing from about 4 to about 10 carbon atoms.

It is to be understood that all of the compounds falling within the above Formula I and as heretofore defined are generically described herein as "isocyanuric acid derivatives." In other words, then, the acids and salts and physical and chemical mixtures thereof are all generically described herein as isocyanuric acid derivatives.

In general, the isocyanuric acid derivatives are prepared by reacting together, under certain conditions, (a) a phosphorus-containing material from the group orthophosphorous acid, a combination of $PCl_3$ and $H_2O$, and a dialkyl phosphite ester (which followed by hydrolysis results in the acid or partial acid),
(b) an aldehyde or a ketone, and
(c) 2-aminoethyl isocyanuric acid, i.e.,

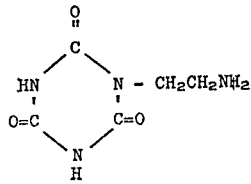

It has been found that by forming a mixture of (a), (b) and (c) and subjecting the mixture to reactive conditions, an isocyanuric acid derivative having at least one N—C—P linkage can be formed.

The aforementioned 2-aminoethyl isocyanuric acid which is one of the basic starting materials in conjunction with the preparation of the isocyanuric acid derivatives falling within Formula I is prepared by the reaction of cyanuric acid with ethylene imine according to the procedure of N. Milstein, Journal of Chemical Engineering Data, volume 13, No. 2, page 275, April 1968, and which publication is incorporated herein by reference.

Aldehydes and ketones (i.e., generically referred to herein as organic carbonyl compounds) that can be used in the preparation of the isocyanuric acid derivatives include all of those having the formula:

(II)

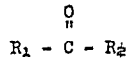

wherein $R_1$ and $R_2$ can be like or unlike, and are selected from the group consisting of hydrogen and organic radicals (heretofore defined). When $R_1$ is hydrogen, the material represented by Formula II is an aldehyde. When both $R_1$ and $R_2$ are organic radicals, it is a ketone. Examples of some of the aldehydes that are useful in the practice of the present invention processes are formaldehyde (such as paraformaldehyde), acetaldehyde, 2-bromoacetaldehyde, caproaldehyde, nicotinaldehyde, crotonaldehyde, 2,2 - dichloromalonaldehyde, gluteraldehyde, p - tolualdehyde, benzaldehyde, 3 - chlorobenzaldehyde, naphthaldehyde, anthraldehyde, 2-furaldehyde, malonaldehyde, phthalaldehyde, 3,5 - dibromophthalaldehyde, 1-cyclohexene - 1 - carboxaldehyde, 3 - quinolinecarboxaldehyde, 3-aminobenzaldehyde, N-(3-formylpropyl) phthalimide, etc. In conjunction with the use of these aldehydes, it is to be understood that they can be used per se or mixed with alcohols in order to, inter alia, facilitate easier handling of the reaction mass, temperature control and the prevention of foaming. For example, if formaldehyde is selected, Formalin, which is a trademark for a 27% (United States) or 40% (United Kingdom) formaldehyde solution, can be used. Generally these alcohol-formaldehyde solutions contain from about 0% to about 40% methanol.

Typical of the ketones that can be used are acetone, methylethylketone, 2-pentanone, 3-pentanone, 1-chloro-2-propanone, butyrone, 1-bromo-7-nitro-r-heptanone, acetophenone, p-bromo-α-chloroacetophenone, 5,6,7,8-tetrahydro - 1 - isobutyronaphthone, capriphenone, α,α-dimethylstearophenone, 1-cyclohexyl-2-methyl-1-propanone, 1-(2-furyl)-1-butanone, 1-(5-quinolyl)-1-pentanone, 2-acetyl chrysene, 4-bromobenzophenone, 2,4-pentanedione, 3,.4-diacetyl-2,5-hexanedione, 3-cyclohexene-1-one, 2(3)-pyridone, 2-acetonyl cyclohexanone, and the like.

Note that the specific examples of aldehydes and ketones presented above do not represent the only such compounds that can be utilized in preparing the compounds falling within Formula I. They are indicative, however, of the very wide range of raw materials that can be used. For example, in the specific examples listed can be found organic radicals such as aliphatic hydrocarbyl, alicyclic, aryl, alkylaryl, heterocyclic, substituted aliphatic hydrocarbyl, substituted alicyclic, substituted aryl, substituted alkylaryl, and substituted heterocyclic radicals. These radicals can be either saturated or unsaturated, and can contain straight or branched chains. Organic radicals containing "rings," too, are illustrated above. Multi-ring radicals containing 2 to 5, or even more, can be utilized to advantage.

Because of factors such as steric hindrance, which can become significant when the preparation of relatively high molecular weight isocyanuric acid derivatives is undertaken, the aldehydes that find greatest utility in the practice of the invention usually contain no more than 30 carbon atoms, while the ketones that are most broadly used herein usually contain no more than 20 carbon atoms.

When it is desired to prepare the ester form (which can be subsequently converted to the acid or partial acid forms via hydrolysis) of the compounds falling within Formula I above, the corresponding dialkyl phosphite ester, $(RO)_2PHO$, wherein R is an alkyl group containing 1 to 20, preferably 1 to 8, carbon atoms, is used in place of orthophosphorous acid as the phosphorus containing specie.

Orthophosphorous acid, illustrated by Formula III, is available commercially.

(III)

For ease of description, orthophosphorous acid will generally be described hereinafter as the phosphorus-containing material reactant.

It can be utilized in the process of the present invention either as the acid, itself, or in the form of its salts, such as its mono- or di-ammonium salts, and mono- or di-alkali metal salts. When orthophosphorous acid is utilized in the salt form, usually an amount of a supplementary acid sufficient to effectively convert the salt form into the more reactive orthophosphorous acid is used. (The use of these "supplementary" acids in the processes will be discussed in more detail subsequently.)

It is to be understood that while $H_3PO_3$ is used in this form, the individual ingredients $PCl_3$ and $H_2O$ which react to make $H_3PO_3$ can be used separately, e.g., added at different points of the process operation.

Ordinarily, for at least one from each of the reacting materials, i.e., items (a), (b) and (c) above, to undergo an interreaction to form one of the isocyanuric acid derivatives, they must simply be mixed together in certain relative proportions (the relative proportions will be described in more detail below), preferably in an acidic aqueous medium, and ordinarily subjected to an elevated temperature for a sufficient period of time to achieve the desired reaction. At room temperature, the rate of interreaction of these materials is slow. (Where time is not a factor, then, the reaction can be carried out at 25° C. or lower.) Increasing the temperature generally results in increasing the rate of the desired reaction, so that, usually, if the temperature of a mixture of phosphorous acid, 2-aminoethyl isocyanuric acid, and an aldehyde or ketone is above about 70° C., the rate of their interreaction is sufficiently high so that conventional mixing and handling equipment can be utilized to produce the isocyanuric acid derivatives continuously and at a commercially practical cost, if desired. It has also been found that increasing the reaction temperature for the processes of this invention (in the temperature range above about 75° C. up to about 200° C. [the latter being the spontaneous decomposition temperature of orthophosphorous acid at atmospheric pressure]) results in a fairly rapid increase in the rate of the desired reaction. Thus, for practical purposes, it is preferred that reaction temperatures for the formation of the isocyanuric acid derivatives, wherein orthophosphorous acid is utilized according to the processes of this invention, be above about 85° C. Temperatures within this preferred range (i.e., about 85° C. to about 200° C.) can readily be maintained by refluxing the aqueous reaction mixture at, above or below atmospheric pressure until the desired reaction has been completed.

It is believed surprising that the pH of the reaction medium has apparently an important influence upon the rate of the desired reaction. For example, it has been found that the rate of the desired reaction in mixtures (containing 2-aminoethyl isocyanuric acid, formaldehyde, and orthophosphorous acid in the molar ratio, respectively, of about 1:2:2) having a pH above about 4 is low. Perhaps one reason for the low rate of the desired reaction in reaction media having pH's above about 4 is that apparently in these systems a competing reaction (the oxidation of orthophosphorous acid to orthophosphoric acid) takes precedence over the desired interaction of orthophoshorous acid with the aldehyde or ketone and 2-aminoethyl isocyanuric acid. Actually, it is preferred that the pH of the reaction mixture (of orthophosphorous acid plus aldehyde or ketone plus 2-aminoethyl isocyanuric acid, and usually at least some water) be below about 4 and preferably about 2 in order to achieve optimum results in the practice of the present invention. When one of the salts of orthophosphorous acid is utilized as a raw material, and when the ratio of reactive 2-aminoethyl isocyanuric acid to orthophosphorous acid in the reaction mixture is relatively high, the "natural," or usual pH of the reaction mixture or reaction medium is generally not within the preferred range. However, the pH of the reaction medium can be adjusted into the most effective range by adding to the system any of the conventional acids having the ability to lower the pH of the reaction medium. For example, hydrochloric, sulfuric, hydrobromic, phosphoric, and sulfonic acids, as well as many others, can be utilized for this purpose.

Another example of providing a low pH and also a halide ion for a catalyst (hereinafter discussed) is the use of a halide salt and an acid. These two ingredients alone accomplish the desired result; however, they may react together to form a salt and a hydrogen halide which also achieves the end result. For example, the use of sodium chloride and sulfuric acid results in the formation of sodium bisulfate and hydrogen chloride.

Ordinarily the desired reaction will be fairly complete, under optimum reaction conditions in a reasonable and practical period of time, for example, in less than about 3 hours, when the relatively low molecular weight isocyanuric acid derivatives are being prepared. Generally, when relatively lower reaction temperatures and when the relatively higher molecular weight aldehydes and ketones are utilized (as raw materials) in the processes herein contemplated, somewhat longer reaction times are required in order to produce optimum yields of the desired products. However, usually no more than about 5 to about 7 hours should be required for the desired reaction to be completed under good reaction conditions, no matter which of the above-described raw materials is utilized. On the average, it can be said that, under optimum reaction conditions, generally from about several minutes to about 3 hours is required in order to produce fairly pure isocyanuric acid derivative products.

It was mentioned heretofore that usually at least some water is present in the reaction medium. While it is not essential that water must be present therein, it has been found that the presence of at least some water contributes substantially to such factors (during and after the reaction) as keeping the reactants in solution, ease of handling of the reaction medium, ease of maintaining the desired reaction temperature (by refluxing, as described above), ease of maintaining adequate heat transfer within the reaction mixture, decreasing the viscosity of the reaction products, etc. Thus, it is desirable that at least about 5 weight percent of water (based on the total weight of the raw reaction materials charged into the reaction mixture), and preferably at least about 15 weight percent of water be present in the reaction mixture before it has been exposed to temperatures above about 90° C. for any extended period of time. Additional water can also be added to the reaction medium from time to time if and as it is needed.

The processes to prepare said isocyanuric acid derivatives can be carried out with conventional, readily available chemical processing equipment. For example, a conventional heated glass-lined mixing (reaction) vessel fitted with a reflux condenser and a fairly efficient stirrer can be advantageously utilized.

The orthophosphorous acid, 2-aminoethyl isocyanuric acid, and aldehydes or ketones can be intermixed in several manipulative manners without detracting appreciably from the benefits that can be derived from the invention. For example, they can be simply poured together in the appropriate proportions (which proportion will be discussed below) into a mixing vessel, blended, and then heated to the reaction temperature. Or the ingredients can be warmed individually, before they are intermixed. (This particular procedure is useful when higher molecular weight, solid aldehydes and ketones are utilized. Thus, they can be melted before they are placed into the reaction vessel.) The 2-aminoethyl isocyanuric acid can be utilized in the form of its acid salts. Sometimes it is convenient and desirable to intermix the 2-aminoethyl isocyanuric acid with the phosphorous acid before they are heated very much above ambient temperatures; especially when the 2-aminoethyl isocyanuric acid is not utilized in the form of salts.

When aldehydes or ketones having boiling points below the temperatures at which the processes to prepare said isocyanuric acid derivatives are operated, usually significantly better yields of the desirable isocyanuric acid derivatives (based on the amount of aldehyde or ketone charged into the reaction vessel), can be atained if the aldehyde or ketone is added slowly (e.g., from about 10 minutes to about 3 hours) to the mixture of orthophosphorous acid and 2-aminoethyl isocyanuric acid while the temperature of said mixture is within the desired range. For example, when an aqueous mixture consisting of one mole of 2-aminoethyl isocyanuric acid, two moles of orthophosphorous acid, and two moles of formaldehyde (calculated theoretically to result in the production of one mole of isocyanuryl ethyl imino di(methylene phosphonic acid)—compound No. 1 hereafter shown—is held at about 100° C.–110° C. for an extended period of time (in order to assure "complete" reaction), less than about 0.5 mole of the desired product is made. However, if the same amount of formaldehyde is added slowly (i.e., over a period of about 65 minutes) to a blend of the same amount of water, one mole of 2-aminoethyl isocyanuric acid and two moles of phosphorous acid held at a temperature of about 100° C.–110° C., more than 0.50 mole of the desired product is produced. Thus, the addition of the aldehyde or ketone slowly to a hot mixture of phosphorous acid and 2-aminoethyl isocyanuric acid is a preferred embodiment to prepare said derivatives.

The isocyanuric acid derivatives result from reacting (a) the phosphorous-containing material, e.g., orthophosphorous acid and (b) an aldehyde or a ketone with (c) 2-aminoethyl isocyanuric acid in a molar ratio of about 2:2:1, respectively. In the processes for preparing said derivatives, excess aldehyde or ketone (over the molar ratio of 2:1 [of aldehyde or ketone to 2-aminoethyl isocyanuric acid, respectively]) can sometimes be utilized to advantage. An excess of orthophosphorous acid, e.g., from about 1% to about 100% by weight, can also be utilized in these processes. However, if the molar ratio of 2-aminoethyl isocyanuric acid to orthophosphorous acid and aldehyde or ketone is raised above 1:2:2, respectively, there may result side reaction products. Thus, when it is desired to produce a relatively pure isocyanuric acid derivative according to these processes, it is preferred that the molar ratio of 2-aminoethyl isocyanuric acid to orthophosphorous acid, respectively, in the reaction mixture to be about 1:2, and that the molar ratio of 2-aminoethyl isocyanuric acid to aldehyde or ketone, respectively, in the reaction mixture be about 1:2.

One reason why yields of the desirable isocyanuric acid derivatives are generally not usually 100% of theory in these processes is that, in addition to the desired N—C—P linkage forming reaction, the orthophosphorous acid also undergoes an oxidation reaction (to form orthophosphoric acid) under the conditions that usually favor the desired reaction. Since in most instances the presence of orthophosphoric acid in the final isocyanuric acid derivative products is not particularly detrimental, the inclusion of excess orthophosphorous acid into the reaction medium is generally all that is necessary to make up for this "loss" of orthophosphorous acid from the desired reaction. (Use of excess acid, however, is presently expensive.) However, it is found that the presence of at least a catalytic amount of halide ions in the reaction mixture (of 2-aminoethyl isocyanuric acid, orthophosphorous acid, aldehyde or ketone, and usually water) inhibits the oxidation of orthophosphorous acid to orthophosphoric acid, and thus makes it possible to produce relatively more of the desired isocyanuric acid derivative product from a given reaction mixture than could otherwise be produced in the absence of halide ions therefrom. Apparently, any simple halide ion can be utilized to accomplish the inhibition described above, although for economic purposes chloride is preferred. The halide ion can apparently be introduced into the reaction mixture in any way whatever without detracting significantly from the benefits that can be derived from practicing the invention, provided it is introduced thereinto before the temperature of the reaction mixture has been heated to or held at about 70° C. for more than a few minutes. For example, it can be added in the form of a hydrohalide acid such as HCl, HBr, HI, etc., or as an inorganic salt, such as NaCl, KCl, NaBr, CaCl$_2$, and the like. Another convenient way is as the hydrogen chloride salt of 2-aminoethyl isocyanuric acid. As mentioned earlier, a mixture of a non-halide containing acid and halide salt can be used to achieve the desired end result. Even very small amounts of halide ions in the reaction mixture have been found to inhibit the oxidation of orthophosphorous acid to some extent. Excellent results can be accomplished when there is utilized in the reaction mixture between about 0.01 and about 10, and preferably at least about 0.5 weight percent of halide ions. Halide ions in excess of these amounts can be present without any apparent detrimental effects on these processes. However, as a practical matter, generally, not more than about 20 weight percent of halide ions is utilized in these processes.

As illustrative (but without limitation) of some of the present invention precipitation inhibitors, these are shown below.

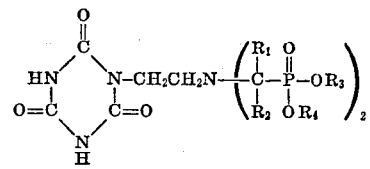

| Compound No. | R$_1$ | R$_2$ | R$_3$ | R$_4$ |
|---|---|---|---|---|
| 1 | H | H | H | H |
| 2 | H | H | Na | Na |
| 3 | H | H | Zn | |
| 4 | C$_6$H$_5$ | H | H | H |
| 5 | C$_6$H$_5$ | H | K | K |
| 6 | CH$_3$ | H | H | H |
| 7 | CH$_3$ | H | Ca | |
| 8 | CH$_3$ | CH$_3$ | H | H |
| 9 | CH$_3$ | CH$_3$ | Na | Na |
| 10 | H | H | NH$_4$ | NH$_4$ |
| 11 | H | H | N(CH$_3$)$_4$ | N(CH$_3$)$_4$ |
| 12 | H | H | N(C$_2$H$_5$)H$_3$ | N(C$_2$H$_5$)H$_3$ |
| 13 | H | H | H | Li |
| 14 | H | H | H | Na |
| 15 | CH$_3$ | H | H | Na |
| 16 | CH$_3$ | CH$_3$ | H | Na |
| 17 | C$_6$H$_4$Cl | H | H | H |
| 18 | C$_6$H$_4$Cl | H | H | Na |
| 19 | C$_6$H$_4$(CH$_3$) | H | H | K |
| 20 | C$_4$H$_9$ | H | H | Na |

Although the precipitation inhibitors of the present invention are of general utility whenever it is desired to inhibit the precipitation of metal ions from aqueous solutions, they are especially effective in such applications as liquid soaps and shampoos, bar soaps, scouring wool cloth, cotton kier boiling, cotton dyeing, cotton bleaching, metal cleaning compounds, rubber and plastics trace metal contamination (compounding and polymerization), and pulp and paper trace metal contamination.

The amount of the precipitation inhibitor necessary to be effective varies with, inter alia, the type and amount of problem metal ions, pH conditions, temperature and the like. When using substoichiometric amounts, the preferred mole ratio of the precipitation inhibitor to the scale forming cation salt is from about 1:1.5 to about 1:10,000. When using sequestering amounts, i.e., at least stoichiometric quantities, the preferred mole ratio is from about 1:1 to about 2.5:1.

It is within the scope of the present invention that the precipitation inhibitors of the present invention may also be used in aqueous systems which contain inorganic or organic materials, with the proviso that such materials do not render the precipitation inhibitors substantially ineffective for their end purpose. For exemplary purposes only, water-soluble inorganic chromates such as those described in U.S. 3,431,217 (which is incorporated herein by reference) may be used in combination with said inhibitors. Other materials which can be used with said precipitation inhibitors include, for example, surface active agents and corrosion inhibitors such as those described in Corrosion Inhibitors, by Beegman, published by MacMillan in 1963; U.S. 3,483,133 and U.S. 3,532,639, all of which are incorporated herein by reference. Furthermore, other precipitation inhibitors such as amino tri(methylene phosphonic acid) may be used in combination with the precipitation inhibitors of the present invention. For exemplary purposes only, these other precipitation inhibitors are described in U.S. 2,970,959, U.S. 3,234,124, U.S. 3,336,221, U.S. 3,400,078, U.S. 3,400,148, U.S. 3,451,939 and U.S. 3,462,365, all of which publications are incorporated herein by reference.

The following examples are included to illustrate the practice of the present invention and the advantages provided thereby but are not to be considered limiting.

EXAMPLE I

In order to demonstrate the sequestering ability of the isocyanuric acid derivatives falling within Formula I above, the compounds identified above as Nos. 1, 4, 6 and 8 are subjected to the sequestration procedure described in the book Coordination Chemistry, "Calcium Complexing by Phosphorus Compounds," by C. F. Callis, A. F. Kerst and J. W. Lyons, pages 223–240, Plenum Press, 1969.

Approximately 1 gram of each of the above described compounds (isocyanuric acid derivatives—"sequestration agents") is individually and separately mixed with 0.1% by weight sodium oxalate in a 2-liter flask containing 1000 milliliters of water. The pH in each case is adjusted by the addition of sodium hydroxide to a pH 11. Into each solution containing the separate and individual sequestration agents there is titrated a 0.1 molar calcium nitrate solution via the use of a Sargent-Malmstadt automatic titrator, Model SE, and which also measures the turbidity by light transmission. The amount of calcium nitrate solution added to each flask is sufficient to provide ample data to plot the point of inflection at which the sequestrant-containing solution goes from a relatively clear solution to a turbid one. This inflection point is then indicative of the amount of calcium that is sequestered by the particular sequestration agent.

The results of the sequestration test on compounds Nos. 1, 4, 6 and 8 show that the various isocyanuric acid derivatives are good sequestrants for calcium and which is one of the major undesirable cations in water which is used, for example, in cooling towers. Specifically, it is found that the isocyanuric acid derivative—compound No. 1—sequesters approximately 6 grams of calcium per 100 grams of said isocyanuric acid derivative. It is also found that the other isocyanuric acid derivatives (compounds 4, 6 and 8) sequester calcium at about an equivalent ratio.

EXAMPLE II

The following example is carried out illustrating the iron sequestering ability of the isocyanuric acid derivatives.

The testing procedure consists of pipetting an aliquot volume of 2.5% ferric chloride solution into a beaker and adding thereto enough sodium hydroxide or hydrochloric acid to give the desired pH. The solution is stirred for fifteen minutes, followed by the addition of an aliquot of 2.5% of the sequestering agent solution, i.e., the particular isocyanuric acid derivative (in the salt form) dissolved in water. After final pH adjustment with sodium hydroxide or hydrochloric acid, the solution is shaken for 48 hours to reach equilibrium. The solution is then centrifuged at 12,000 r.p.m. for approximately 60 minutes to remove colloidal ferric hydroxide and an aliquot of the supernatant solution is titrated iodometrically or analyzed by X-ray fluorescence with use of an appropriate calibration curve in order to determine the ferric iron concentration. The ferric iron concentrations and sequestering agent concentrations found in parts per million (p.p.m.) are converted to a weight basis and expressed as pounds of iron sequestered by 100 pounds of sequestering agent.

Following the above described procedure, each of the compounds Nos. 1 through 20 heretofore described is individually tested. In each case it is found that the precipitation inhibitors of the instant invention demonstrate an unexpected and unique ability to sequester ferric iron over a wide range of pH conditions, i.e., from about 4 to about 10.5, and that the average amount (in pounds) of iron sequestered by 100 pounds of the respective precipitation inhibitor (compound No.) over the 4 to 10.5 pH range is in each case at least 10 pounds of iron (III).

EXAMPLE III

The above Example II is repeated several times with the exception that other metal ion-containing solutions such as calcium, copper, nickel and chromium are utilized in place of the ferric (chloride) solution. In each case utilizing the aforementioned compounds the average sequestration values of these latter mentioned ions respectively are found to be similar to those set forth above.

Example II is again repeated several times, utilizing as a sequestering agent trisodium nitrilo triacetate·2H$_2$O, sodium citrate, and potassium gluconate. It is found that the pounds of iron sequestered by 100 pounds of the aforementioned sequestering agents respectively are 7.0, 6.5 and 2.9 over the same pH range of 4 to 10.5. It can readily be seen, then, that the isocyanuric acid derivatives (in the acid or salt forms) of the present invention when utilized as sequestering agents are equally as effective as the widely used organic sequestering agents under comparative conditions and in some cases are superior thereto. Furthermore, when such derivatives of the present invention are utilized as sequestering agents, they exhibit an effectiveness as such over a wide range of pH conditions. This is highly advantageous in permitting their respective use in many and varied applications.

EXAMPLE IV

The present invention isocyanuric acid derivatives falling within Formula I also exhibit threshold properties, i.e., they can be utilized in less than stoichiometric quantities to prevent the precipitation of salts of mineral acids, such as CaCO$_3$, in aqueous systems. Specifically, a test is conducted in which each of the compounds, i.e., Nos. 1 through 20, is separately and independently mixed at 25° C. with 250 milliliters of water containing CaCl$_2$. To the resultant mixture is added NaHCO$_3$. The pH in each case is adjusted to 7 and maintained thereat with sufficient NaOH or HCl. The amounts of CaCl$_2$, NaHCO$_3$ and inhibiting agent used are sufficient to provide 5000 p.p.m. of CaCO$_3$ and 10 p.p.m. of isocyanuric acid derivative (precipitation inhibitor). It is observed in each case that these less than stoichiometric quantities of said precipitation inhibitors (threshold agents) effect a substantially clear solution for a period of at least 48 hours. Stating the results in a different manner, 10 parts per million of the isocyanuric acid derivative (threshold agent) is effective in providing a clear solution without precipitation which contains substantially greater than stoichiometric quantities of calcium carbonate therein.

EXAMPLE V

Two solutions, A and B, are prepared in order to demonstrate the "threshold effect" of only 5 parts of isocyanuryl ethyl imino di(methylene phosphonic acid) per 1,000,000 parts of solution containing large quantities of CaSO$_4$. (The 5 p.p.m. is based on a 100% active phosphonic acid basis.) Solution A is prepared by dissolving the appropriate amount of said acid in water and then adding calcium chloride following by the addition of sodium sulfate. The amounts of sodium sulfate and calcium chloride used are sufficient to result in the solution containing 10,000 p.p.m. of CaSO$_4$ and then the pH is adjusted to 7. Solution B is prepared in the same manner except that the CaSO$_4$ concentration is 12,500 p.p.m. The solutions are stored with continuous agitation at 25° C. Two "control" solutions C and D are prepared in the same manner as solutions A and B except that the "control solutions"

do not contain any of the threshold agent—i.e., said phosphonic acid.

These tests show that the "control" solutions C (10,000 p.p.m. CaSO$_4$) and D (12,500 p.p.m. CaSO$_4$) within a few minutes after preparation each result in the precipitation of CaSO$_4$. However, in solutions A and B (both of which contain said phosphonic acid), the solutions per se remain clear over an extended period of at least 22 days at the 10,000 p.p.m. CaSO$_4$ level and at least 15 days at the 12,500 p.p.m. CaSO$_4$ level. At the end of the aforementioned 15 day and 22 day periods, the solutions A and B are clear to visual observation and 100% of all the CaSO$_4$ remains in solution as further determined by titration of a sample of each solution with a standard solution of ethylene diamine tetraacetic acid using an Eriochrome Black T indicator.

The foregoing examples have been described in the foregoing specification for the purpose of illustration and not limitation. Many other modifications and ramifications will naturally suggest themselves to those skilled in the art based on this disclosure. These are intended to be comprehended as within the scope of this invention.

What is claimed is:

1. A method of inhibiting the precipitation and/or altering the crystal form of scale-forming salts in an aqueous system comprising adding to said system at least a precipitating inhibition amount of an isocyanuric acid derivative having the formula

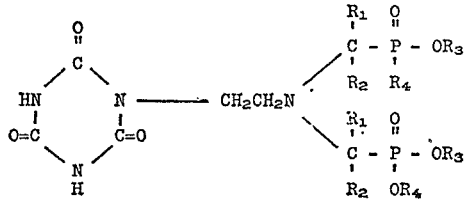

wherein
(a) R$_1$ and R$_2$ are each selected from the group consisting of hydrogen and organic radicals; and
(b) R$_3$ and R$_4$ are each selected from the group consisting of metal ions and hydrogen.

2. The method of claim 1 wherein the scale-forming salt is alkaline earth metal carbonates, sulfates, oxalates, phosphates, fluorides or silicates.

3. The method of claim 1 wherein the mole ratio of precipitation inhibitor to scale-forming salts is from about 1 to 1.5 to about 1 to 10,000.

4. The method of claim 3 wherein the precipitation inhibitor is present in the system at concentrations from about 0.1 part per million to about 500 parts per million.

5. The method as set forth in claim 1 wherein R$_3$ and R$_4$ are hydrogen.

6. The method as set forth in claim 1 wherein R$_3$ and R$_4$ are each a metal ion selected from the group consisting of alkali metals, alkaline earth metals, aluminum, zinc, calcium, magnesium and mixtures thereof.

7. The method as set forth in claim 1 wherein the isocyanuric acid derivative is a compound having the formula

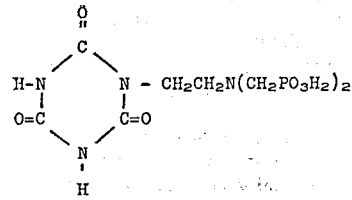

8. The method as set forth in claim 1 wherein said aqueous system contains additional water-treating agents.

9. The method as set forth in claim 1 wherein the aqueous system contains a water-soluble chromate.

10. The method as set forth in claim 1 wherein said aqueous system contains zinc ions.

11. The method as set forth in claim 1 wherein the scale-forming salt is an ion hydroxide.

References Cited
UNITED STATES PATENTS 3,328,398  6/1967  Cousserans _____ 260—248 NS
3,336,221  8/1967  Ralston _____ 252—8.55 B JOHN T. GOOLKASIAN, Primary Examiner M. E. McCAMISH, Assistant Examiner U.S. Cl. X.R.

210—58; 252—8.55 B; 260—248 NS, 938, 946

UNITED STATES PATENT OFFICE
CERTIFICATE OF CORRECTION

Patent No. 3,654,169                    Dated April 4, 1972

Inventor(s) Edwin A. Matzner and Robert S. Mitchell

It is certified that error appears in the above-identified patent and that said Letters Patent are hereby corrected as shown below:

In column 8, in the table under Compound No. 3, lines should be inserted each side of "Zn" connecting $R_3$ and $R_4$.

In the same table, under Compound No. 7, lines should be inserted each side of "Ca" connecting $R_3$ and $R_4$.

In column 12, line 33, the word "ion" should read ---iron---.

Signed and sealed this 25th day of July 1972.

(SEAL)
Attest:

EDWARD M. FLETCHER, JR.                ROBERT GOTTSCHALK
Attesting Officer                       Commissioner of Patents